United States Patent
Archer et al.

(10) Patent No.: US 8,244,728 B2
(45) Date of Patent: Aug. 14, 2012

(54) METHOD AND APPARATUS FOR DATA EXPLORATION

(75) Inventors: Geraldine E. Archer, Portsmouth (GB); Richard A. Hopkins, Yarm (GB); Kevin H. Jenkins, Hampshire (GB); Philip D. Tetlow, Stockton on Tees (GB); Christopher C. Winter, Waterlooville (GB)

(73) Assignee: International Business Machines Corporation, Armonk, NY (US)

( * ) Notice: Subject to any disclaimer, the term of this patent is extended or adjusted under 35 U.S.C. 154(b) by 459 days.

(21) Appl. No.: 12/122,914

(22) Filed: May 19, 2008

(65) Prior Publication Data

US 2008/0313200 A1 Dec. 18, 2008

(30) Foreign Application Priority Data

Jun. 12, 2007 (EP) .................................. 07110089

(51) Int. Cl.
*G06F 17/00* (2006.01)
(52) U.S. Cl. .......................... 707/736; 707/737
(58) Field of Classification Search .................. 707/737, 707/736, 999.001–999.01; 705/14.53, 14.54
See application file for complete search history.

(56) References Cited

U.S. PATENT DOCUMENTS

| | | | |
|---|---|---|---|
| 6,167,564 A | 12/2000 | Fontana et al. | |
| 6,253,337 B1 | 6/2001 | Maloney et al. | |
| 6,308,178 B1 | 10/2001 | Chang et al. | |
| 6,671,724 B1 | 12/2003 | Pandya et al. | |
| 6,917,938 B2 | 7/2005 | Shea et al. | |
| 7,047,518 B2 | 5/2006 | Little et al. | |
| 7,949,997 B2 | 5/2011 | Chessell et al. | |
| 2001/0014868 A1 * | 8/2001 | Herz et al. | 705/14 |
| 2003/0023953 A1 | 1/2003 | Lucassen et al. | |
| 2003/0105887 A1 | 6/2003 | Cox et al. | |
| 2003/0120502 A1 | 6/2003 | Robb et al. | |

(Continued)

FOREIGN PATENT DOCUMENTS

CA 2436763 A1 8/2005

OTHER PUBLICATIONS

Dance et al., "A Methodology for the 3D Modeling and Visualization of Concurrency Networks", Dept. of Computer and Information Science and Engineering, University of Florida, Gainesville, Florida 32611.

(Continued)

*Primary Examiner* — Mohammad Ali
*Assistant Examiner* — John Hocker
(74) *Attorney, Agent, or Firm* — Hoffman Warnick LLC

(57) ABSTRACT

A method and apparatus for data exploration in a data processing system. An apparatus according to an embodiment includes: an analyzing component for analyzing a data model to identify a first and a second data entity and a relationship between the first and the second data entity; a generator component for creating a first and second atom data entity associated with the first and the second data entity; a generator component for creating a link data entity associated with the relationship between the first and second data entity; and an assignor component for assigning a behavior to one of the atom data entities or the link data entity, wherein the atom data entity exhibits a behavior associated with the link data entity and wherein the link data entity exhibits a behavior associated with one of the atom data entities.

14 Claims, 9 Drawing Sheets

U.S. PATENT DOCUMENTS

| | | | |
|---|---|---|---|
| 2003/0182651 A1 | 9/2003 | Secrist et al. | |
| 2003/0182652 A1 | 9/2003 | Custodio | |
| 2004/0143390 A1* | 7/2004 | King et al. | 701/213 |
| 2004/0254904 A1 | 12/2004 | Nelken et al. | |
| 2005/0104771 A1* | 5/2005 | Terry et al. | 342/195 |
| 2005/0114829 A1 | 5/2005 | Robin et al. | |
| 2005/0166178 A1 | 7/2005 | Masticola et al. | |
| 2005/0216882 A1 | 9/2005 | Sundararajan et al. | |
| 2006/0184933 A1 | 8/2006 | Chessell et al. | |
| 2006/0229921 A1 | 10/2006 | Colbeck | |
| 2007/0109111 A1* | 5/2007 | Breed et al. | 340/435 |
| 2008/0100805 A1* | 5/2008 | Majumder et al. | 353/30 |
| 2008/0184933 A1 | 8/2008 | Henrich et al. | |
| 2008/0309468 A1* | 12/2008 | Greene et al. | 340/436 |
| 2008/0312830 A1* | 12/2008 | Liu et al. | 701/301 |
| 2009/0064241 A1* | 3/2009 | Fellenstein et al. | 725/87 |
| 2010/0169934 A1* | 7/2010 | Kennedy | 725/62 |

OTHER PUBLICATIONS

Oliveira et al., "Conceptual Model for Adaptable and Extensible Visual Data Exploration", Proceedings of SPIE-IS&T Electronic Imaging, SPIE vol. 5295, © 2004, pp. 212-222.

Sturler et al., "A New Approach to Software Integration Frameworks for Multi-Physics Simulation Codes", Center for Simulation of Advanced Rockets, Center for Simulation of Advanced Rockets, University of Illinois at Urbana-Champaign, Jul. 15, 2000, 12 pages.

Frankel, "Model Driven Architecture: Applying MDA to Enterprise Computing", Wiley Publishing, Inc., 2003, 17 pages.

Abowd et al., "Applying Dynamic Integration as a Software Infrastructure for Context-Aware Computing", http://smartech.gatech.edu/bitstream/handle/1853/3545/97-18.pdf?sequence=1, 1997, 10 pages.

Hayim, U.S. Appl. No. 11/345,138, Office Action Communication, GB920050006US1, Sep. 17, 2009, 18 pages.

Hayim, U.S. Appl. No. 11/345,138, Office Action Communication, GB920050006US1, May 27, 2010, 25 pages.

Hayim, U.S. Appl. No. 11/345,138, Notice of Allowance & Fees Due, GB920050006US1, Jan. 18, 2011, 12 pages.

U.S Appl. No. 11/345,138, Preliminary Amendment and Request for Continued Examination, GB920050006US1, dated Aug. 30, 2010, 23 pages.

U.S Appl. No. 11/345,138, Office Action Response, GB920050006US1, dated Dec. 16, 2009, 19 pages.

* cited by examiner

METHOD AND APPARATUS FOR DATA EXPLORATION

FIELD OF THE INVENTION

The invention relates to the field of data storage and retrieval systems and in particular to a method and apparatus for data exploration.

BACKGROUND OF THE INVENTION

Information is complex and the complexity of the information is often difficult to convey in a simple, clear and precise manner. Standard techniques used for conveying complex concepts to people are standard tools such as presentation software or drawing tools. A drawback with this approach is that a) the complex information is abstracted to such a high level that the complexity is lost and the concepts are incorrectly conveyed or b) the presentation or drawing material comprises too much information and the reader can not understand the information and becomes frustrated.

Another problem occurs when trying to comprehend and/or visualize data in a storage and retrieval device, particularly with respect to semantically rich information. Again this is a very complex environment comprising thousands of data elements which are all linked to each other in some form or another. It is difficult to 'make sense' of this information in an easy manner and often complex tools are used in order to manipulate the data into some meaningful form. The information is also difficult to share with others. The information can be split into smaller data elements but then this loses the benefit of storing the semantically rich information in a storage and retrieval mechanism, such as, an inventory or database.

Thus there is a need in the art to find a means to convey complex information to users in a clear and concise manner.

SUMMARY OF THE INVENTION

Viewed from a first aspect, the present invention provides an apparatus for data exploration in a data processing system, comprising: an analyzing component for analyzing a data model to identify a first and a second data entity and a relationship between the first and the second data entity; a generator component for creating a first and second atom data entity associated with the first and the second data entity; a generator component for creating a link data entity associated with the relationship between the first and second data entity; and an assignor component for assigning a behavior to one of the atom data entities or the link data entity, wherein the atom data entity exhibits a behavior associated with the link data entity and wherein the link data entity exhibits a behavior associated with both atom data entities.

Advantageously, the present invention provides for a data exploration component which generates a representation of a data model. The data exploration component parses a data model to determine how the data model is derived. This is done by determining how many entities 'make up' the data model and whether an entity has a relationship with another entity. Then a representation of each of the entities and their relationships is generated in the form of atom data entities and link data entities. Each atom data entity and link data entity has its own assigned self contained behavior which allows the representation to become active and therefore self-organizing.

The active representation allows a user to manipulate data in environments where the use of complicated algorithms is not possible. The active representation provides for the representation of semantically rich information.

Viewed from a second aspect, the present invention provides a method for data exploration in a data processing system, comprising: analyzing a data model to identify a first and a second data entity and a relationship between the first and the second data entity; creating a first and second atom data entity associated with the first and the second data entity; creating a link data entity associated with the relationship between the first and second data entity; and assigning a behavior to one of the atom data entities or the link data entity, wherein the atom data entity exhibits a behavior associated with the link data entity and wherein the link data entity exhibits a behavior associated with one of the atom data entities.

Viewed from a third aspect, the present invention provides a computer program product loadable into the internal memory of a digital computer, comprising software code portions for, when the product is run on a computer: analyzing a data model to identify a first and a second data entity and a relationship between the first and the second data entity; creating a first and second atom data entity associated with the first and the second data entity; creating a link data entity associated with the relationship between the first and second data entity; and assigning a behavior to one of the atom data entities or the link data entity, wherein the atom data entity exhibits a behavior associated with the link data entity and wherein the link data entity exhibits a behavior associated with one of the atom data entities.

BRIEF DESCRIPTION OF THE DRAWINGS

Embodiments of the invention are described below in detail, by way of example only, with reference to the accompanying drawings.

DETAILED DESCRIPTION OF THE INVENTION

Figure 1:
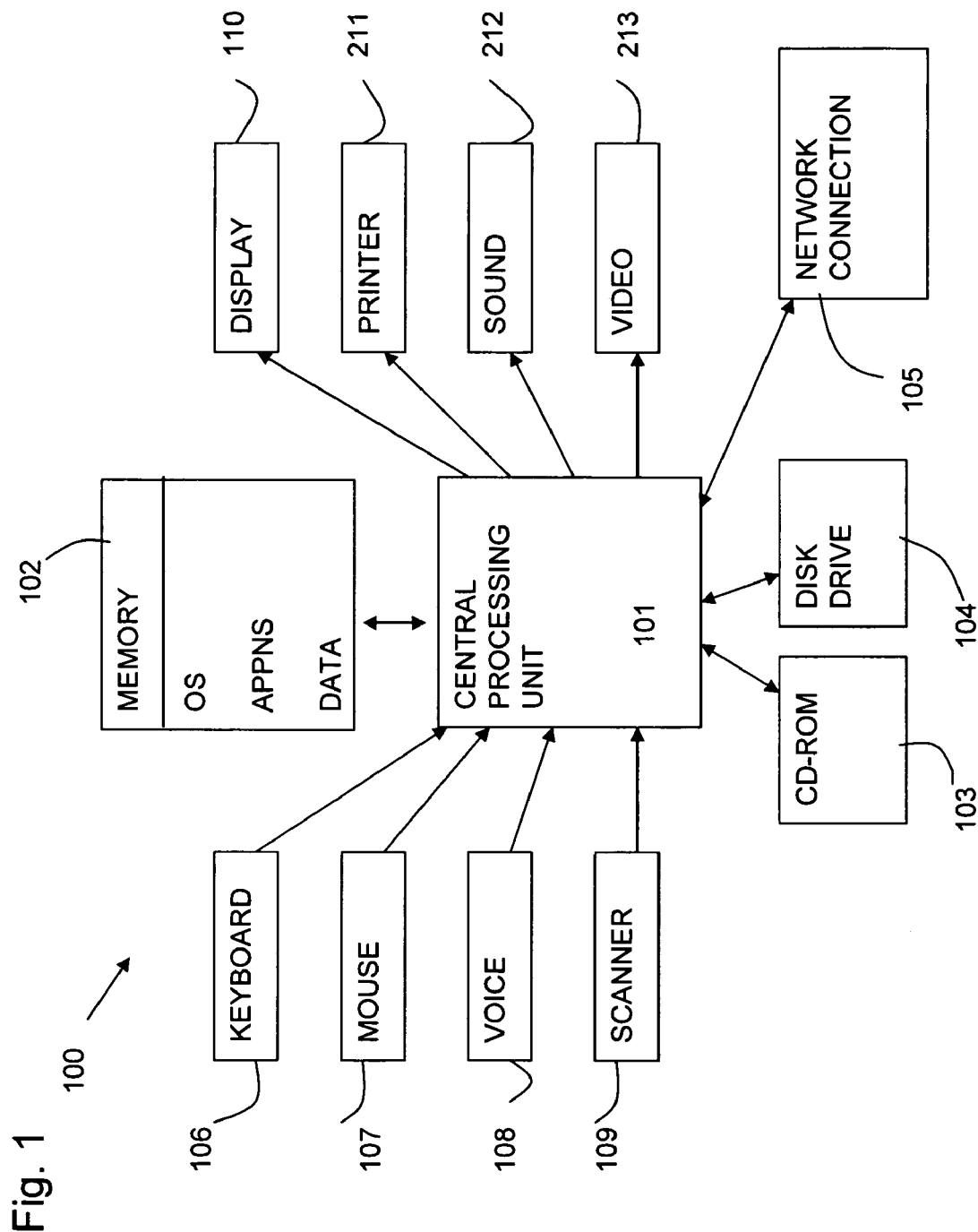
FIG. 1 is a block diagram detailing a computer system in which the present invention may be embodied.

In accordance with an embodiment of the present invention a computer system is provided in which an embodiment of the data exploration apparatus may be implemented.}

The computer system 100 has a central processing unit 101 with primary storage in the form of memory 102 (RAM and ROM). The memory 102 stores program information and data acted on or created by application programs. The program information includes the operating system code for the computer system 100 and application code for applications running on the computer system 100. Secondary storage includes optical disk storage 103 and magnetic disk storage 104. Data and program information can also be stored and accessed from the secondary storage.

The computer system 100 includes a network connection 105 for interfacing the computer system 100 to a network such as a local area network (LAN) or the Internet. The computer system 100 may also have other external source communication means such as a fax modem or telephone connection.

The central processing unit 101 comprises inputs in the form of, as examples, a keyboard 106, a mouse 107, voice input 108, and a scanner 109 for inputting text, images, graphics or the like. Outputs from the central processing unit 100 may include a display means 110, a printer 111, sound output 112, video output 113, etc.

In a distributed system, a computer system 100, as shown in FIG. 1, may be connected via the network connection 105 to a server (not shown) on which applications may be run remotely from the central processing unit 101.

Applications may run on the computer system 100 from a storage component 103, 104 or via a network connection 105, which may include database applications, etc. A user's computer system is not limited to any type of data processing system or apparatus, and may be a conventional desktop or lap-top personal computer, a personal digital assistant or a mobile phone or any other specialized data processing device, which is capable of running a data exploration component.

In a first embodiment, the data exploration component 200 is implemented as a computer program module which extends and modifies existing data modeling programs and/or data storage and retrieval programs. In particular, this embodiment provides a 'plug-in' program module for existing data storage and retrieval programs. Once installed, 'plug-in modules' are recognized automatically by the data storage and retrieval program by a simple API call. Alternatively, the data exploration component 200 may be implemented by incorporation into an existing data storage and retrieval system. The data exploration component 200 may run from a local computer system or from a computer system remotely connected to the local computer system.

Figure 2:
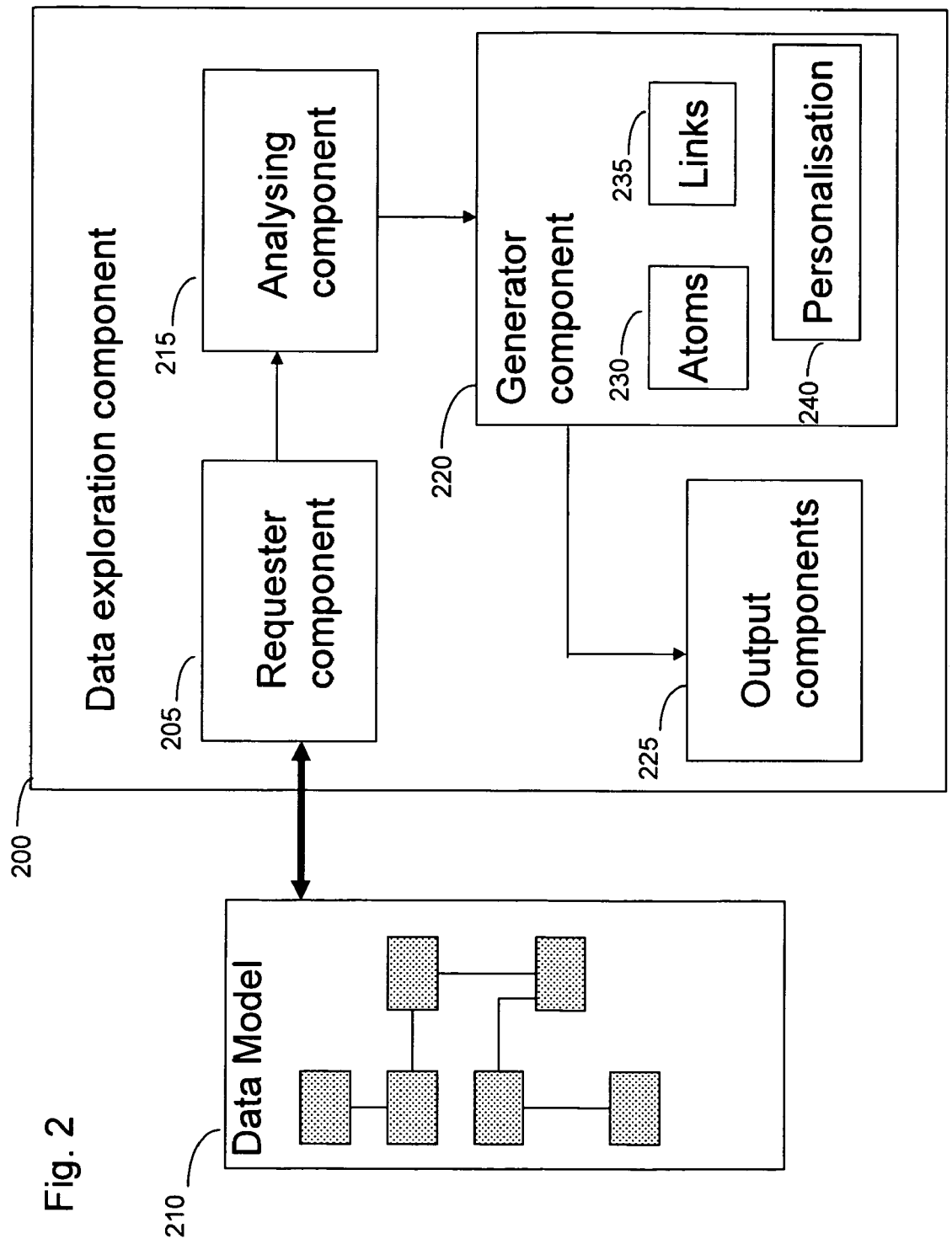
FIG. 2 is a block diagram detailing a visualization component in accordance with an embodiment of the present invention.

FIG. 2 illustrates the data exploration component 200 in accordance with an embodiment of the present invention. The data exploration component 200 comprises a number of components that interface and interact with each other in order to provide the benefits and advantages of an embodiment of the invention. The data exploration component 200 comprises a requester component 205 for accessing a data model 210 and an analyzing component 215 for analyzing the data model 210 in order to determine:

a) the number of entities shown in the data model 210; and
b) a relationship (represented by links) between each of the shown entities.

The data exploration component 200 further comprises a generator component 220 comprising an atom generator component 230, a link generator component 235, and a personalization component 240 for generating:

a) a representation of an entity in the form of an atom data entity or other two-dimensional, three or n-dimensional representation;
b) a representation of a relationship in the form of a link data entity linking one atom data entity to another; and
c) a personalization means for personalizing an atom data entity in accordance with its personalization characteristics identified in the data model.

The data exploration component 200 also comprises output component(s) 225 for displaying the representation of the entities and their relationships in the form of atom data entities and link data entities.

The requester component 205 is arranged so as to interface with a data store in order to access a data model 210. The requester component 205, on receipt of a trigger action by a user, transmits a request to the data store requesting access to the chosen data model 210. In an alternative embodiment, a trigger action may be generated automatically by a trigger component.

The data model 210, typically, describes the semantics of an organization and represents a series of assertions about the nature of the organization. Specifically, the data model 210 illustrates business and information technology requirements or specifications (entities and their characteristics) that are significant to an organization and the relationships between one or more of those entities.

Figure 3:
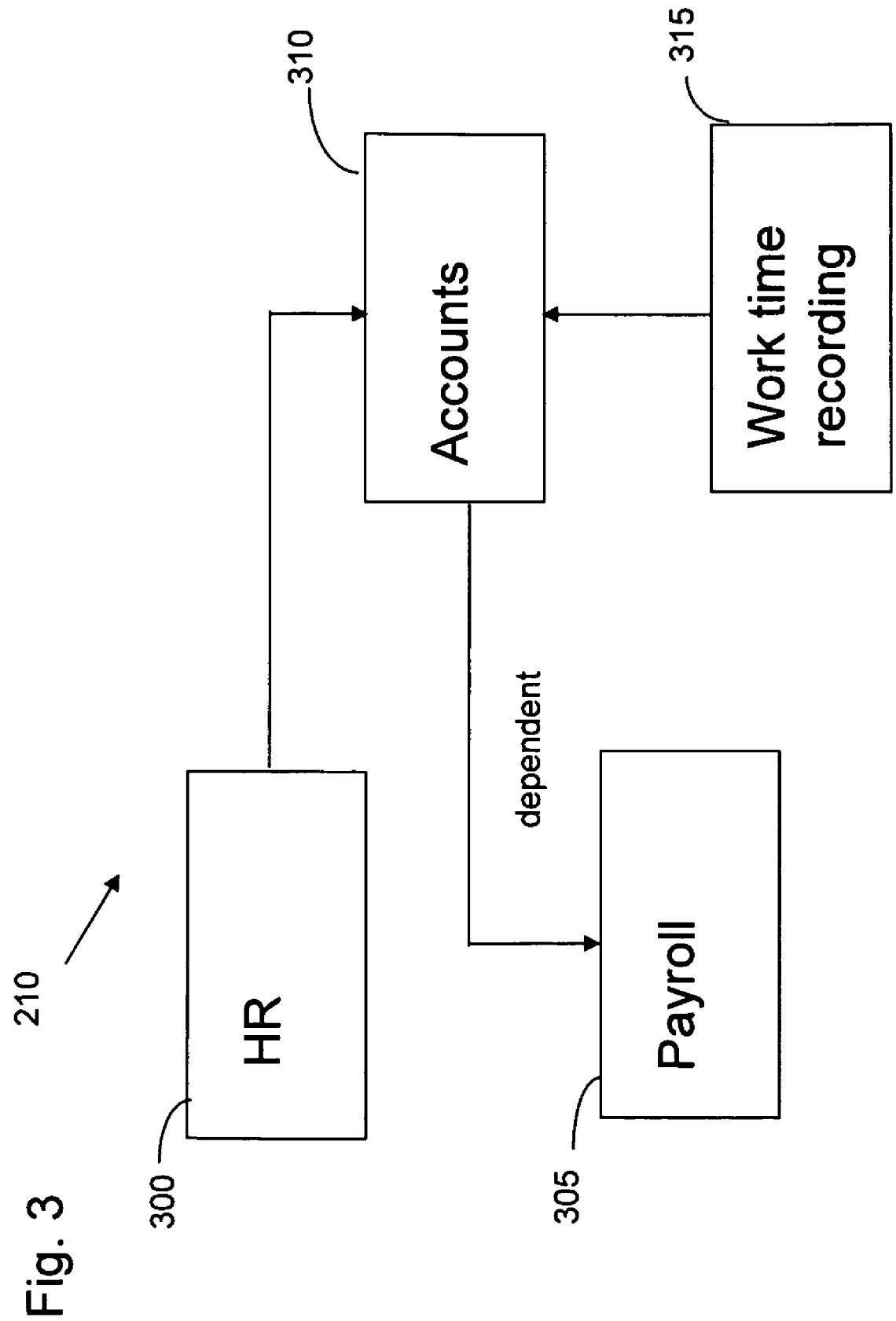
FIG. 3 is a block diagram illustrating a data model in accordance with an embodiment of the present invention.

To illustrate this further, FIG. 3 shows a simplified example of a data model 210. The data model 210 comprises four entities 300, 305, 310, 315 which are seen, for example, as of particular importance to an organization. Each one of these entities 300, 305, 310, 315 represents a requirement of an organization, for example, a payroll system 305 for paying its employees, an HR system 300 for managing the 'hiring and firing' of employees and for managing confidential information about its employees, a work time recording system 315 for providing functionality to users which allow them to record the amount of hours worked, and an accounts system 310 for managing the financial debits and credits attributed to the organization.

As shown in FIG. 3, an entity can have at least one relationship with another entity. For example, the payroll system 305 is dependent on the accounts system 310 making available enough money to pay the organization's employees. If, for example, the accounts system 310 is not operational because of a technical fault, then the payroll system 305 is impacted. The same holds true if the work recording system 315 is not operational then the accounts system 310 is unable to calculate the amount of pay an employee should be paid.

Moving back to FIG. 2, the analyzing component 215 is arranged in order to receive the data model 210 from the requestor component 205. The analyzing component 215 analyses the data model 210 to determine how many entities 300, 305, 310, 315 are listed in the data model 210 and to identify all of an entity's relationships with other identified entities.

The analyzing component 215 does this by parsing the data model 210 and extracting information associated with each listed entity 300, 305, 310, 315. The information may comprise the name of the entity, its relationship to another entity and its current state for example.

The analyzing component 215 determines how many entities 300, 305, 310, 315 are listed and the relationships that each of the entities 300, 305, 310, 315 share with other entities 300, 305, 310, 315. The analyzing component 215 also determines any particular characteristics associated with an entity 300, 305, 310, 315. The information is extracted and listed in, for example, two tables as shown in Tables 1 and 2 below. However, in reality these tables may be held as an in-memory representation by the analyzing component 215.

TABLE 1

| Entity | Link Relationship | Linked Data Entity |
|---|---|---|
| Payroll | is dependent on | Accounts |
| Accounts | is dependent on | Work time recording |
| Accounts | is dependent on | HR |

TABLE 2

| Entity | Characteristics | Attractor |
|---|---|---|
| Payroll | System | Head Office |
| Accounts | System | Head Office |
| HR | System | Head Office |
| Work Time Recording | End User System | Branch Office |

On completion of the tables (or in-memory representation), a trigger is sent, from the analyzing component 215, to the generator component 220. The generator component 220 parses the tables in order to gather information in order to generate a representation of the information disclosed within table.

Figure 4:
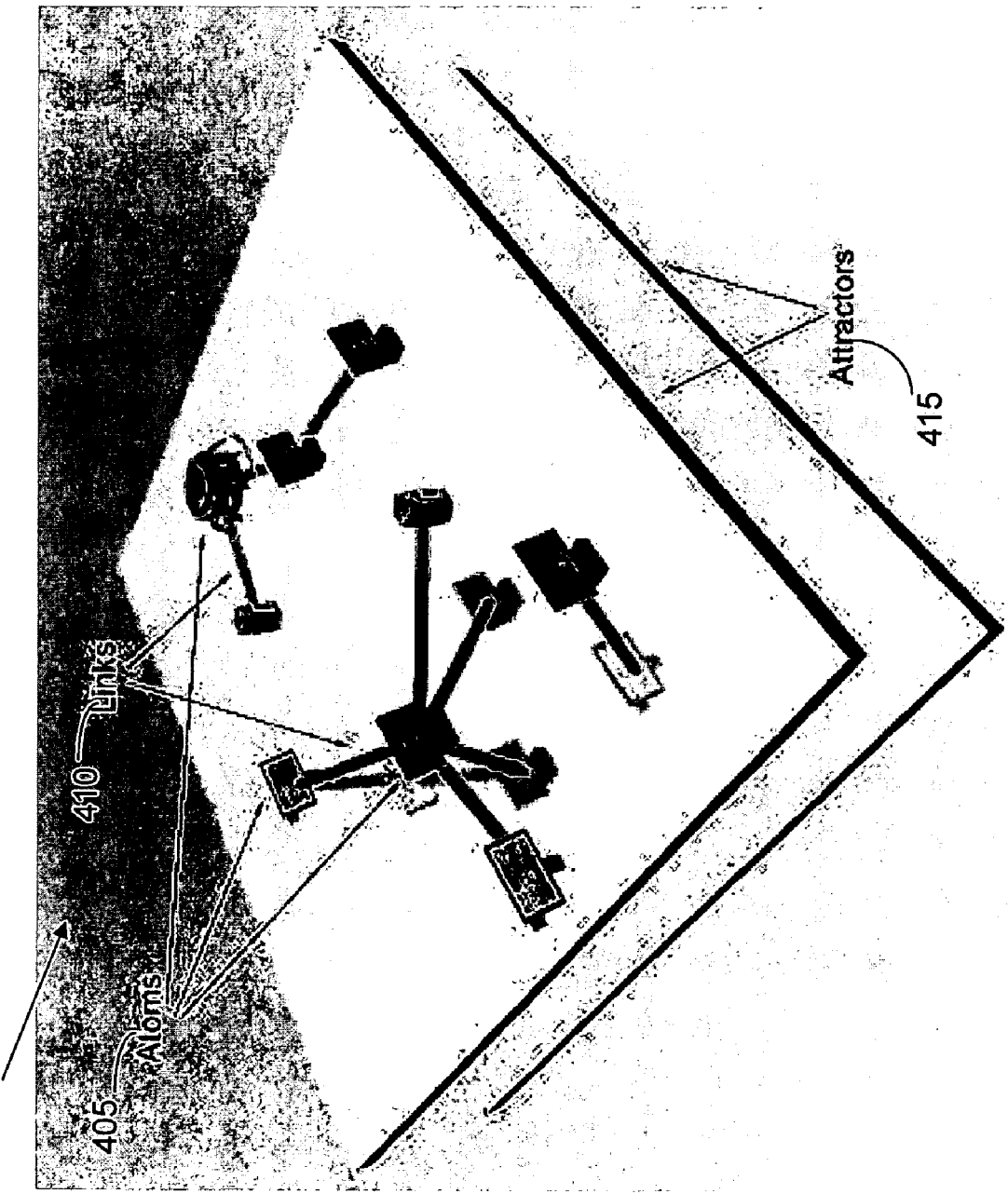
FIG. 4 is an example of an active representation of a data model in accordance with an embodiment of the present invention.

The generator component 220 extracts the information associated with a first entity and then an atom generation component 230 generates a representation of the first entity in the form of, for example, an atom data entity or some other multi-dimensional object. The generator component 220 parses each line in the table until a representation of each entity within the table is completed. To understand this further, FIG. 4 shows a representation 400 of entities and their relationships to other entities in the form of atom data entities 405 and link data entities 410.

Moving back to FIG. 2, the atom generation component 230 sends a trigger to a link generation component 235 requesting that the link generation component 235 generate the required links from one atom data entity 405 to another data entity 405 (i.e., the links that represent a relationship between a first atom data entity 405 and a second atom data entity 405 as indicated in the data model 210). Once completed, the link generation component 235 sends a trigger to the personalization component 240 to assign behavior to each of the generated atom data entities 405.

An atom data entity's behavior is known from the data model 210 and extracted by the analyzing component 215. Its behavior may be defined by characteristics such as its color, that it is a certain type of system, that it comprises a certain type of data, and it has a relationship with one of more other atom data entities, etc.

In order to allow the representation of atom data entities 405 and link data entities 410 to be active, i.e., to be able to respond to external commands, infer certain types of relationships, etc., the atom generation component 230 generates a communication channel for each atom data entity 405. The communication channel allows an atom data entity 405 to broadcast messages to other atom data entities 405 and link data entities 405. Such messages may comprise 'I am here' type messages which inform other atom data entities of its positional coordinates. The communication channel also allows atom data entities to listen to 'I am here' commands from other atom data entities 405. Thus as each atom data entity 405 broadcasts its position, other atom data entities 405 which are defined as being related to a broadcasting atom data entity 405 can listen for their specific positional coordinates and 'move' in the data space towards their respective related atom data entity 405. The same procedure occurs for each link data entity 410, as each link data entity 410 will listen for the position coordinates of an atom data entity 405 that it is linked to and move in the defined direction.

The atom generation component 230 also assigns up to three forces (though all are optional for each atom data entity 405, depending upon the analysis of the data model 210). These forces are an attractor force, a repulsion force and a linking force.

An attractor force when assigned informs the atom data entity 405 that it is attracted to an arbitrary n-dimensional shape called an attractor 415. In addition, when assigned the atom data entity 405 may be assigned a repulsion force which will make it move away from one or more other atom data entities 405 assigned to the same attractor 415. Finally, a linking force 410 will link together two atom data entities 405 if they are semantically linked in the data model 210.

Each atom data entity 405 is assigned an input means in which its behavior can be modified, adapted, changed etc by input parameters received from a user.

In order to explain the above concepts further, FIGS. 5 to 8 explain the principles behind the process steps of the generator component 220.

Figure 5:
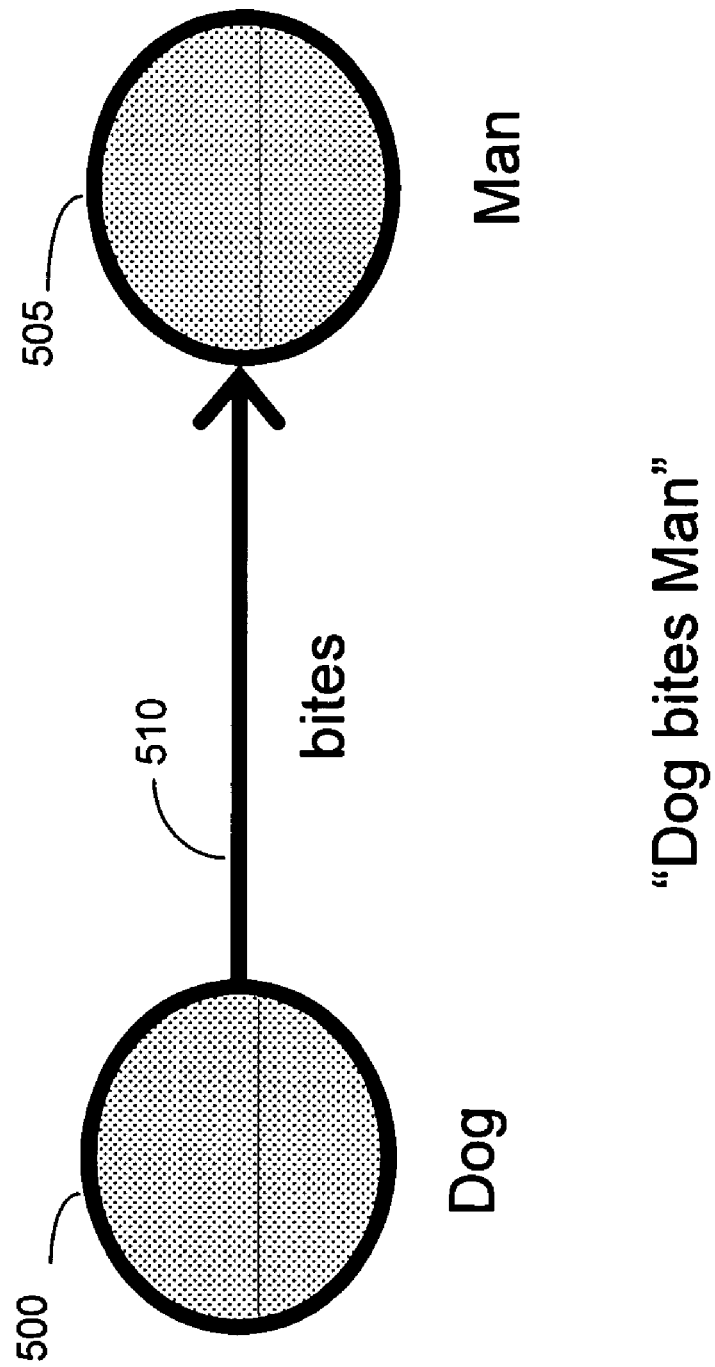
FIG. 5 is a block diagram detailing two atom data entities and a relationship between the first and second atom data entities, in accordance with an embodiment of the present invention.

FIG. 5 shows two atom data entities generated by the generator component 220, namely an atom data entity 500 associated with a concept 'man' and an atom data entity 505 associated with a concept 'dog'. The link 510 from atom data entity 500 'man' to atom data entity 505 'dog' describes the relationship between atom data entity 500 'man' and atom data entity 505 'dog', i.e., the relationship is 'bite' such that the 'dog bites man'. Hence a link data entity 510 represents a 'bite' relationship between the atom data entity 500 'man' and atom data entity 505 'dog'.

Figure 6:
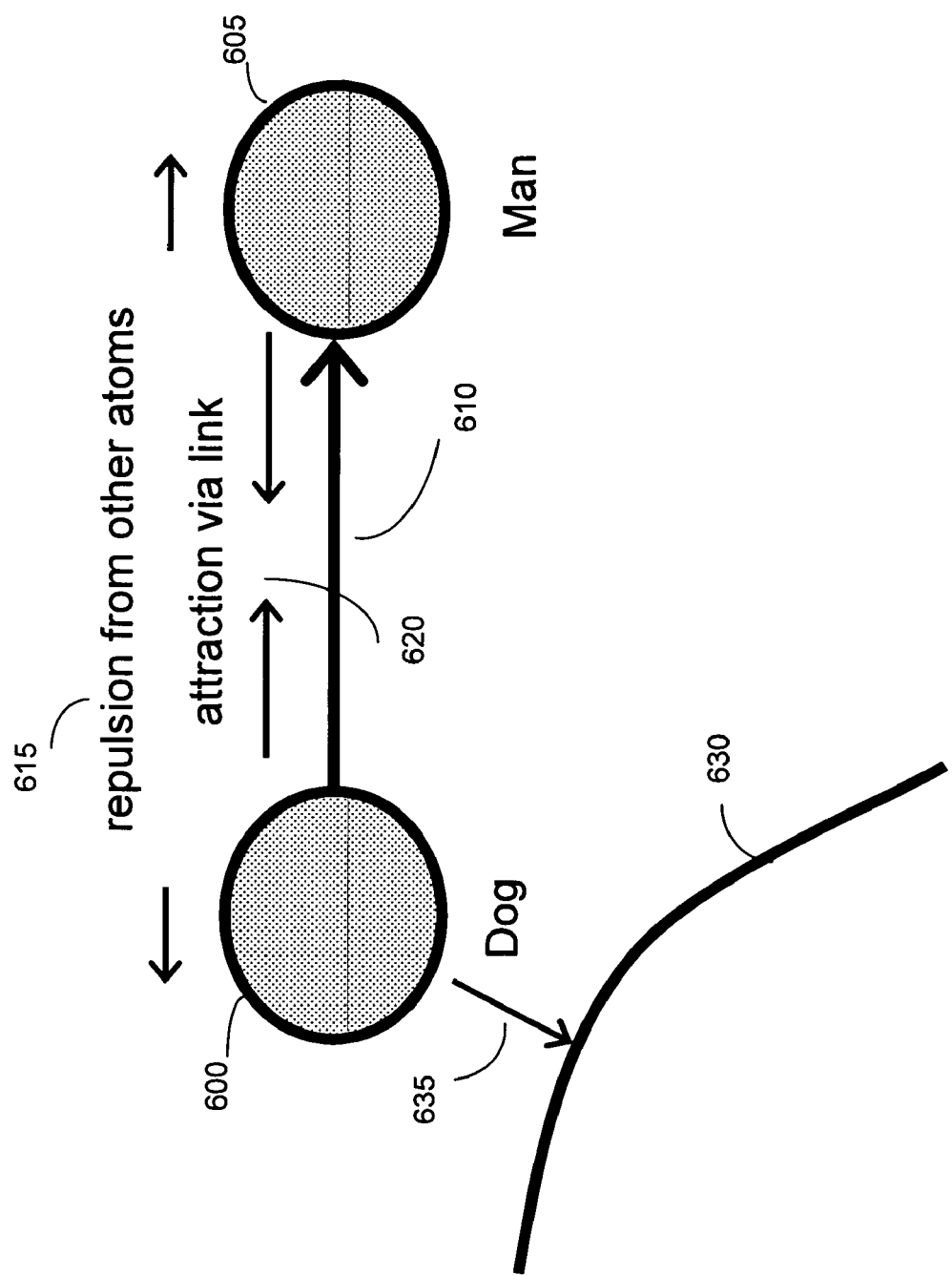
FIG. 6 is a block diagram of two atom data entities and detailing the principle of an attractor force associated with the first and second atom data entities, in accordance with an embodiment of the present invention.

FIG. 6 shows each atom data entity 600, 605 having a set of forces acting on it. The atom data entity 600 'dog' is attracted by the force 620 to the atom data entity 605 'man' by the link data entity 610 from atom data entity 600 'dog' to atom data entity 605 'man'. However, the atom data entity 600 'dog' is also pulling away, i.e., repulsed 615 by the atom data entity 605 'man' and vice versa.

The Figure also shows the atom data entity 600 being pulled towards its attractor 630 by a force 635.

When the above forces 615, 620, 635 are in equilibrium, the atom data entities 600, 605 are stationary. In other circumstances; the atom data entities 600, 605 will move to find a more stable position. The forces on an atom data entity 600, 605 can be explained as follows:

A repulsive force 615 between any atom data entities within an arbitrary radius. The repulsion caused is proportional to 1/d where d is the distance between the centers of gravity of two atom data entities 600, 605. The repulsion acts along the line which connects the centers of gravity of two atom data entities 600, 605.

A link data entity 610 attached to a first and second atom data entity 600, 605 causes an attractive force 620 at each end of an atom data entity 600, 605 when the length of the link data entity 610 exceeds an arbitrary value. The direction of the force 620 is towards the center of the link data entity 610 and is proportional to a link data entity length.

A positional force 635 which attracts an atom data entity 600, 605 towards a 'home' location or attractor 630. The positional force is in the direction of the shortest vector between the atom data entity and the 'home'. The positional force is the proportional to the length of this shortest vector. The home location or attractor 630 can be a specific point, a line of any kind (e.g., the perimeter of a circle or square) a two-dimensional surface (e.g., a rectangle) or a three-dimensional surface (e.g., a sphere or cube).

Figure 7:
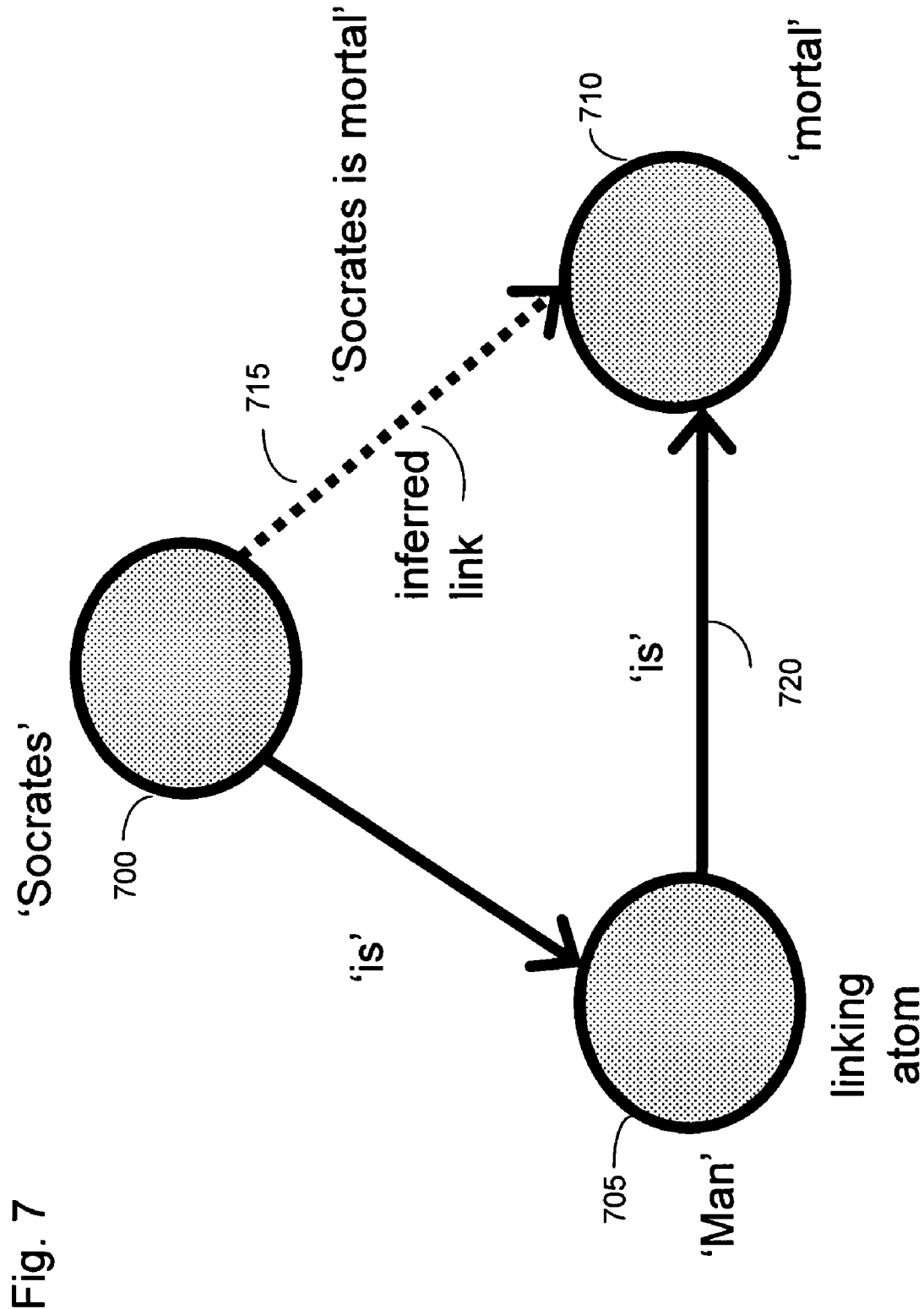
FIG. 7 is a block diagram showing a first, second and third atom data entity and the principle of inference associated with a first, second and third atom data entity, in accordance with an embodiment of the present invention.

The representation of the data model 210 is active, i.e., it responds to additional input data provided by an external source and as such the representation is also capable of simple inference. FIG. 7 illustrates this further.

FIG. 7 depicts an example comprising three atom data entities, namely 'man' 705, 'Socrates' 700 and 'mortal' 710. The atom data entity 'Socrates' 700 is associated with a link data entity 715 'is' to the atom data entity 'man' 705 i.e. 'Socrates is [a] man'. The atom data entity 'man' 705 is associated with a link data entity 'is' 720 to the atom data entity 'mortal' 710, i.e., 'man is mortal'. However, atom data entity 'Socrates' 700 is not associated with any link data 715 entity connecting it with the atom data entity 'mortal' 710.

However, because the representation tells us that 'Socrates' is a 'man' and that a 'man' is 'mortal' it follows that 'Socrates' must also be 'mortal' because 'Socrates' is a 'man'. Thus a link between atom data entity 'Socrates' 700 and atom data entity 'Mortal' 710 can be inferred.

At generation, each atom data entity 600, 605 is optionally given one or more abstraction patterns that it is looking to identify. In this example in FIG. 7 the abstraction pattern provided was that two 'is' relationships between three atom data entities (in this case 700 'is' 705 'is' 710), can be abstracted or simplified to a single 'is' relationship between the two atom data entities at each end of the link 700 and 710.

Figure 8:
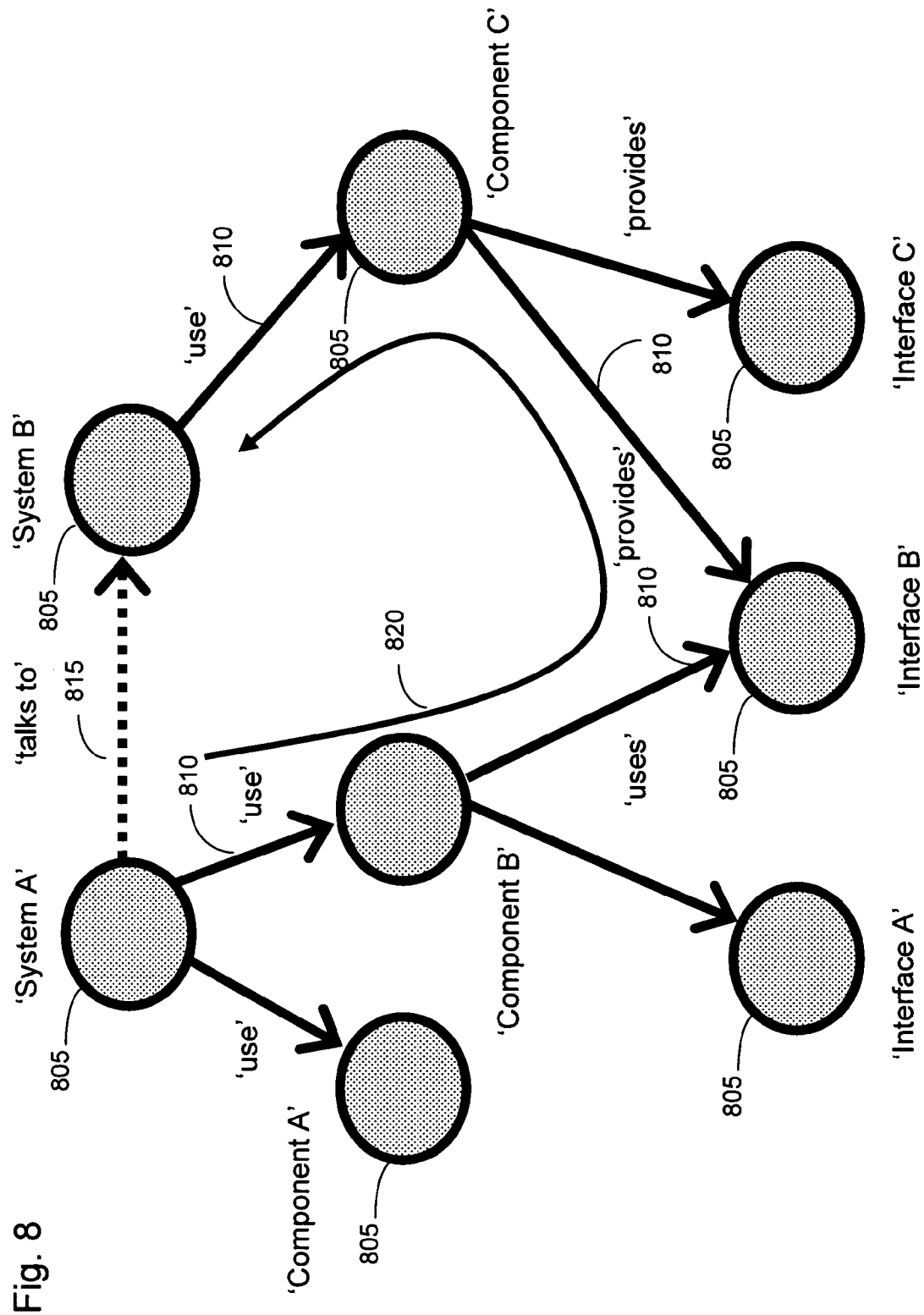
FIG. 8 is a block diagram showing another example of an active representation of a data model.

FIG. 8 shows a more complex example of an active data model representing Systems, Components and Interfaces. Each 'System', 'Component' and 'Interface' is represented by an atom data entity 805. The relationships between atom data entities ('Systems', 'Components' and 'Interfaces') are represented as link data entities 810. There are three valid link data entity types in this simple example. These are 'Components' "which provide" 'Interfaces' (C provides I), 'Components' "which use" 'Interfaces' (C uses I) and 'Systems' "which use" 'Components' (S uses C).

In this example there can be no direct links between 'Systems' as (S talks to S) is a 'System' to 'System' link is not considered a valid link data entity type. However this information may be useful and can be inferred 815 when the representation finds a pattern of 'System' uses 'Component' uses 'Interface' provided from 'Component' used by 'System' where each item in the chain is a unique linked atom data entity 805. It should be noted that some of the link data entities are traversed backwards, so their meaning becomes opposite: used becomes used by and provides becomes provided by.

To work out whether a 'System' 'talks to' another 'System', the message 820 needs to start from a 'System' atom data entity, traverse a 'Component' a shared 'Interface', a 'Component' and end up at a 'System' atom data entity. For convenience we shall abbreviate this pattern as S C→I←C←S and atom identifier as 'atomid'.

This is achieved in the active representation by the atom data entity 805 asking each of its link data entities 810 what its target is. The link data entity responds after asking its other associated atom data entity. If the atom data entity is the next in the chain, then the message 820 S→C→I←C←S is passed to it along with a list of the previous atom identifiers in the chain. In this case message 820 (S[atomid]→C[atomid]→I←C←S) is received by the identified 'Component' atom data entity. As a result that 'Component' now searches for an 'Interface' at the end of its links and the pattern repeats. Eventually a 'System' may be identified at the end of the chain and at this point the message will read (S[atomid]→C[atomid]→I[atomid]←C[atomid]←S[atomid]). The chain is now complete, so at that point an inferred "talks to" link data entity 815 is generated between the two System atom data entities. Inferred links are temporary and are periodically refreshed to ensure the inferences remain accurate if the model changes.

Figure 9:
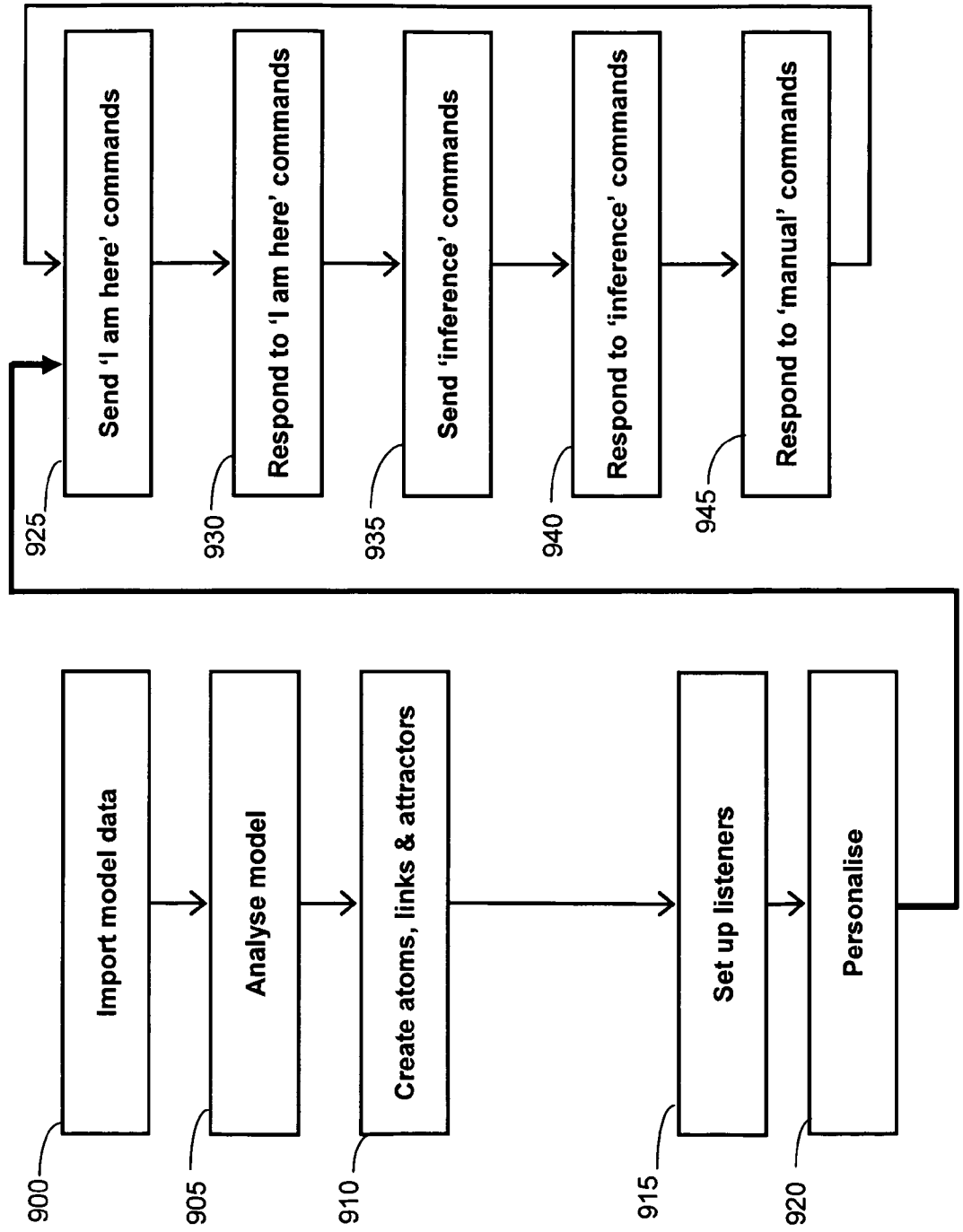
FIG. 9 is a flowchart detailing the process steps of the generator component, in accordance with an embodiment of the present invention.

FIG. 9 is a flow chart detailing illustrative operation steps of an embodiment of the invention.

At step 900, the requester component 205 requests access to a predefined data model 210 from a data store. On receipt of the data model 210, at step 905 the analyzing component 215 proceeds to analyze the data model 210 to determine how many entities are listed in the data model 210 and to determine one or more relationships between an entity and another entity. The analyzing component 215 also identifies the characteristics associated with an entity.

On completion of the analysis step, control passes to the generator component 220. At step 910, the generator component 220 creates a representation of the entities and each of the entity's relationships with other entities, via an atom component 230, a link component 235 and a personalization component 240. The atom component 230 creates a representation of each entity identified in the data model 300. The atom component 230 also creates the attractor functionality which is associated with each of the atom data entities (as explained with reference to FIG. 5). Next, the link component 235 creates a representation of a relationship between one atom data entity and another atom data entity (as shown in FIG. 3).

At step 915, the atom component 230 generates a communication channel for each atom data entity. The communication channel comprises a sending and receiving means for each of the atom data entities to receive external commands from a user. For example, the communication channel may be used in order to modify the behavior of the representation to show what would happen if one of the atom data entities were removed and how the removal would affect other atom data entities which are linked to it.

The atom component 230 on creation of an atom data entity assigns each atom an identifier, at step 920. Using this identifier, the personalization component accesses the personalization settings for each of the atoms and, using the information, personalizes the atom's look and/or behavior. For example, the information may comprise the name, type, tolerance to other atom data entities, data pertaining to how close an atom can get to another atom and attractor information such as the name of the atom data entity that an atom data entity is attracted to.

Once all atom data entities are personalized, the atom data entities and link data entities then perform a series of actions. These are as follows: at step 925, the atom data entities and link data entities broadcast 'I am here' commands to their respective link data entities and atom data entities, at step 930 atoms respond to 'come here' commands.

At generation time each link data entity is assigned the identifier's of its 'from' and 'to' atom data entities and the link data entities use this information to listen to 'I am here' messages and to know where to broadcast its 'come here' commands. Atom data entities are made aware at generation time of their own identifier's which enables them to know which 'come here' commands to listen to.

Atom data entities will respond to all 'come here' commands aimed at them by link data entities that indicate that the link data entity that connects them to the other atom data entities is outside of the set tolerance level. The atom data entity will move towards the center of the link data entity and the distance moved will be proportional to the link data entity's length.

In addition each atom data entity will broadcast its 'I am here' message to all other atom data entities. An atom data entity is aware of its own position, so it can calculate the distance to other atom data entities from the 'I am here' messages it receives. If an atom data entity that it is repulsed by is within the set tolerance level then a repulsion force acts. The repulsion force is proportional to 1/d where d is the calculated distance between the centers of gravity of the two atom data entities. The repulsion acts along the line which connects the centers of gravity of the two atom data entities.

At step 935, each atom sends an 'inference command'. These inference commands are composed of 'abstraction patterns' of atoms that can be used to infer a higher level connection.

At generation, each atom data entity is optionally given one or more abstraction patterns that it is looking to identify.

At step 945, each atom responds to any manual commands received. Manual commands can either be issued to all atoms, or can be addressed to individual atom identifiers. The commands themselves enable the user to delete an atom, or to change its type or its characteristics, including whether or not to respond to forces.

Steps 925 through to 945 are continually performed whilst the representation is active.

It will be clear to one of ordinary skill in the art that all or part of the method of the embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In one alternative, embodiments of the present invention may be realized in the form of a computer implemented method of deploying a service comprising steps of deploying computer program code operable to, when deployed into a computer infrastructure and executed thereon, cause the computer system to perform all the steps of the method.

In a further alternative, embodiments of the present invention may be realized in the form of data carrier having functional data thereon, the functional data comprising functional computer data structures to, when loaded into a computer system and operated upon thereby, enable the computer system to perform all the steps of the method.

It will be clear to one skilled in the art that many improvements and modifications can be made to the foregoing exemplary embodiments without departing from the scope of the present invention.

The invention claimed is:

1. An apparatus for data exploration in a data processing system, comprising:
   an analyzing component for analyzing a data model to identify a first and a second data entity and a relationship between the first and the second data entity;
   a generator component for creating a first and second atom data entity associated with the first and the second data entity, wherein the first and second atom data entity are representations of the first and second data entity respectively;
   a generator component for creating a link data entity associated with the relationship between the first and second data entity, wherein the link data entity is a representation of the relationship;
   an assignor component for assigning at least one behavior to one of the atom data entities or the link data entity, wherein the atom data entity exhibits at least one behavior associated with the link data entity and wherein the link data entity exhibits at least one behavior associated with one of the atom data entities, and wherein the at least one behavior comprises an attractor force indicating that at least one of the first or second atom data entity is attracted to at least one other atom data entity that is distinct from the first and second atom data entity; and a personalization component for accessing a set of personalization settings for each of the first and second atom data entities and altering a look of the first and second atom data entities based on the settings.

2. The apparatus according to claim 1, wherein the at least one assigned behavior further comprises a positional force, or a repulsion force.

3. The apparatus according to claim 1, wherein the generator component further creates a third atom data entity and infers a link data entity from the first atom data entity or the second atom data entity to the third atom data entity.

4. The apparatus according to claim 1, wherein the generator component further creates a communication channel for each atom data entity.

5. The apparatus according to claim 4, wherein the communication channel broadcasts positional coordinates to related atom data entities and link data entities.

6. The apparatus according to claim 5, wherein the related atom data entity responds to broadcasts of positional coordinates by moving in a direction towards the broadcasting atom data entity.

7. The apparatus according to claim 1, wherein the assignor component further comprises a component for assigning a map of patterns of types of atom data entities and link data entities which an atom data entity and a link data entity is to identify when receiving input from an external source or on creation of an active representation.

8. A method for data exploration in a data processing system, comprising:

analyzing a data model to identify a first and a second data entity and a relationship between the first and the second data entity;

creating a first and second atom data entity associated with the first and the second data entity, wherein the first and second atom data entity are representations of the first and second data entity respectively;

creating a link data entity associated with the relationship between the first and second data entity, wherein the link data entity is a representation of the relationship;

assigning at least one behavior to one of the atom data entities or the link data entity, wherein the atom data entity exhibits at least one behavior associated with the link data entity and wherein the link data entity exhibits at least one behavior associated with one of the atom data entities, and wherein the at least one behavior comprises an attractor force indicating that at least one of the first or second atom data entity is attracted to at least one other atom data entity that is distinct from the first and second atom data entity; and accessing a set of personalization settings for each of the first and second atom data entities and altering a look of the first and second atom data entities based on the settings.

9. The method according to claim 8, wherein the at least one assigned behavior further comprises a positional force, or a repulsion force.

10. The method according to claim 8, further comprising creating a third atom data entity and inferring a link data entity from the first atom data entity or the second atom data entity to the third atom data entity.

11. The method according to claim 8, further comprising creating a communication channel for each atom data entities.

12. The method according to claim 11, wherein the communication channel broadcasts positional coordinates to related atom data entities and link data entities.

13. The method according to claim 12, wherein the related atom data entity responds to broadcasts of positional coordinates by moving in a direction towards the broadcasting atom data entity.

14. A computer program product loadable into the internal memory of a digital computer, comprising software code portions for, when the product is run on a computer:

analyzing a data model to identify a first and a second data entity and a relationship between the first and the second data entity;

creating a first and second atom data entity associated with the first and the second data entity, wherein the first and second atom data entity are representations of the first and second data entity respectively;

creating a link data entity associated with the relationship between the first and second data entity, wherein the link data entity is a representation of the relationship; and assigning at least one behavior to one of the atom data entities or the link data entity, wherein the atom data entity exhibits at least one behavior associated with the link data entity and wherein the link data entity exhibits at least one behavior associated with one of the atom data entities, and wherein the at least one behavior comprises an attractor force indicating that at least one of the first or second atom data entity is attracted to at least one other atom data entity that is distinct from the first and second atom data entity; and accessing a set of personalization settings for each of the first and second atom data entities and altering a look of the first and second atom data entities based on the settings.

* * * * *